(12) United States Patent
Burke, II et al.

(10) Patent No.: US 8,122,128 B2
(45) Date of Patent: Feb. 21, 2012

(54) SYSTEM FOR REGULATING ACCESS TO AND DISTRIBUTING CONTENT IN A NETWORK

(76) Inventors: Robert M. Burke, II, Los Gatos, CA (US); David Z. Carman, San Jose, CA (US)

( * ) Notice: Subject to any disclaimer, the term of this patent is extended or adjusted under 35 U.S.C. 154(b) by 1727 days.

(21) Appl. No.: 10/989,023

(22) Filed: Nov. 16, 2004

(65) Prior Publication Data

US 2005/0125528 A1    Jun. 9, 2005

(51) Int. Cl.
*G06F 15/173* (2006.01)
(52) U.S. Cl. ....................................... 709/225
(58) Field of Classification Search .................. 709/225
See application file for complete search history.

(56) References Cited

U.S. PATENT DOCUMENTS

| | | | |
|---|---|---|---|
| 6,516,416 B2 | 2/2003 | Gregg et al. | |
| 6,694,429 B1 | 2/2004 | Kalmanek, Jr. et al. | |
| 2001/0051996 A1 | 12/2001 | Cooper et al. | |
| 2002/0059440 A1 | 5/2002 | Hudson et al. | |
| 2002/0103778 A1* | 8/2002 | Saxena | 707/1 |
| 2002/0120577 A1 | 8/2002 | Hans et al. | |
| 2002/0145981 A1 | 10/2002 | Klinker et al. | |
| 2002/0169865 A1 | 11/2002 | Tarnoff | |
| 2003/0204602 A1 | 10/2003 | Hudson et al. | |
| 2003/0233281 A1 | 12/2003 | Takeuchi et al. | |
| 2005/0033990 A1* | 2/2005 | Harvey et al. | 713/201 |

OTHER PUBLICATIONS

International Search Report dated Jan. 31, 2006.

* cited by examiner

*Primary Examiner* — Jeffrey Pwu
*Assistant Examiner* — Shripal Khajuria
(74) *Attorney, Agent, or Firm* — Schwabe, Williamson & Wyatt, P.C.

(57) ABSTRACT

There is provided a system for regulating access and managing distribution of content in a network, such as the Internet. The system includes communication gateways, installed at a subscriber site, internet control points, installed remotely, and various network elements installed throughout the network. The communication gateways and network elements operate in conjunction with the internet control points to restrict or allow access to specified Internet sites and to manage efficient distribution of content such as music, video, games, broadband data, real-time audio and voice applications, and software to subscribers.

50 Claims, 7 Drawing Sheets

SYSTEM FOR REGULATING ACCESS TO AND DISTRIBUTING CONTENT IN A NETWORK

TECHNICAL FIELD

This invention is in general related to regulation of access to a network and, more particularly, to distributing content efficiently while protecting the digital rights associated with the content.

BACKGROUND

The network commonly known as the Internet, or any similar private or managed network, provides a convenient medium for the delivery of electronic data or content such as music, video, games, broadband data, real-time audio and voice applications, and software to subscribers. To accomplish these purposes, the Internet is composed of several components including, for example, content providers for generating content; service providers for delivering content; subscriber terminals for receiving, displaying and playing content; and various additional network elements between service providers and subscribers for aiding in the distribution of the content. Service providers include, for example, telephone line carriers, enterprise data centers, and cable television providers. Subscriber terminals are located at subscriber premises and include, for example, personal computers, televisions configured with modems, a combination of both, or any other combination of consumer electronics capable of presenting electronic content to a subscriber.

Interest in providing delivery of content via the Internet has remained high throughout the growth of the Internet. Several problems have yet to be overcome, however, before the Internet is fully effective at delivering content efficiently and rapidly, while also protecting the rights of the owners of content, that is, the owners of intellectual property. Techniques for protecting this intellectual property are often referred to as Digital Rights Management (DRM). Recent music industry lawsuits over the distribution of pirated music are evidence of the difficulties not yet solved by current DRM techniques.

Service providers and content providers need the assurance that the intellectual property (music, video, games, software, etc.) will be secure from illegal downloading and transmission over the Internet, a major source of lost revenues and the basis for hundreds of lawsuits. Service providers want this feature to halt the legal onslaught launched by music companies and to encourage the motion picture industry to license their content for distribution over the otherwise unsecured Internet. The motion picture industry is understandably reluctant, having seen the negative impact that piracy has already had on the Music Recording Industry. Content providers thus demand this feature to stop the illegal downloading and transmission of intellectual property over the Internet which has cost the music and movie industries billions of dollars annually. Techniques that reduce the strain on a content provider's resources and reduce the high volumes of network data traffic are also desirable in order to improve the speed and efficiency of accessing content in a network.

Another difficult problem that remains to be solved is providing a means for law enforcement agencies to execute warrants to wire-tap Internet communications such as email and real-time audio and video communications. A solution to this problem is especially desirable considering the importance of thwarting terrorist attacks. The Patriot Act and other recently passed legislation indicate the desirability and importance of providing such capabilities to law enforcement bodies.

It is therefore desirable to provide new access regulation and data traffic control techniques that can be made available to telephone line carriers, ISPs, enterprises, cable television companies, for their Internet access networks. In addition, it is desirable to provide a means for law enforcement bodies to combat the prevalent use of Internet communications in planning illegal operations. In particular, it is desirable to meet these needs using the service provider's existing distribution network.

SUMMARY

Consistent with the invention, there is provided a system for regulating access to a network. The system comprises a controller node coupled to the network, the controller node comprising a first processor for generating controller instructions and a first network interface for transmitting the controller instructions over the network. The system also comprises a plurality of gateway units, the gateway units comprising a user interface receiving user-entered network access requests, a second network interface coupled to the network and receiving the controller instructions from the network and a second processor, the second processor selectively transmitting at least some of the network access requests over the network in accordance with the controller instructions, and transferring content data responsive to the transmitted network access requests over the network via the second network interface.

Consistent with another aspect of the present invention, there is also provided a system for regulating access to a network that is accessed by a plurality of users. The system comprises a controller node coupled to the network, the controller node comprising a first processor for generating controller instructions and a first network interface for transmitting the controller instructions over the network. The system also comprises a plurality of network units associated with a first group of users, the network units comprising a second network interface coupled to the network and receiving the controller instructions from the network and a second processor, the second processor inhibiting access for a second group of users to content in the network in accordance with the controller instructions.

Consistent with yet another aspect of the present invention, there is also provided a system for distributing content over a network. The system comprises a controller node coupled to the network, the controller node comprising a first processor for generating controller instructions and a first network interface for transmitting the controller instructions over the network. The system also comprises a plurality of network units, the network units comprising a second network interface coupled to the network, the second network interface in at least a first one of the network units receiving the controller instructions from the network and receiving a portion of a content data file from at least a second one of the network units and a second processor, the second processor in the at least first one of the network units selectively forwarding the portion of the content data file received from the at least second one of the network units to at least a third one of the network units in accordance with the controller instructions.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DETAILED DESCRIPTION

System Architecture

Figure 1:
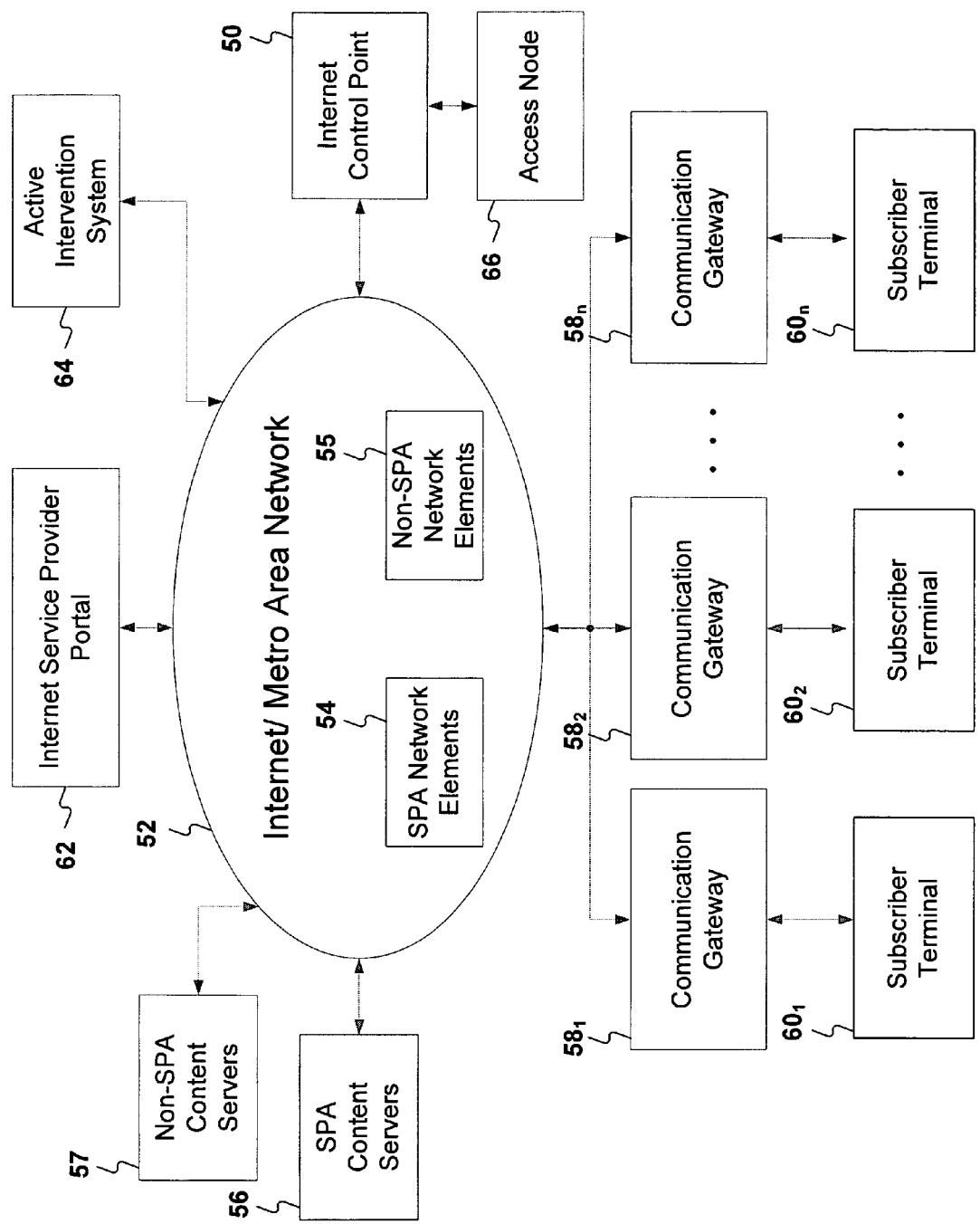
FIG. 1 depicts the overall environment in which the present invention is implemented.

Consistent with principles of the present invention, there is provided a system including a Service Preference Architecture (SPA). The SPA is a collection of hardware components and software routines executed by the components. Components installed at a subscriber's site may be referred to as gateway units, or more specifically, Communication Gateways (CGs). The subscribers may include residential and business subscribers. The CGs may include a data storage device such as a hard drive, and are operable between active and inactive states. CGs operate in conjunction with SPA-based Internet Service Providers (ISPs) under the control of "controller nodes," hereinafter referred to as Internet Control Points (ICPs). The ICPs are installed in an ISP's network. ICPs may be network-based routers or computers that control the operation of CGs.

The software routines located in CGs and ICPs provide a suite of features for the system. ISPs, such as telecommunication carriers, electronic data centers, and cable TV companies, may be equipped to deliver the suite of features by using a network service based system.

In general, the SPA uses ICPs to control subscriber access to web sites and to deliver data to subscribers. The ICPs control the processing of data sent between subscribers (e.g., client PCs or LAN servers) and the ISPs or content servers with which they are exchanging information, using the CGs. The ICPs cooperate with hardware and software of the CGs located at a subscriber's premises to provide the specific features of the system.

The CGs cannot be tampered with by subscribers. This is accomplished by two aspects of the CGs. First, CGs are specifically designed to permit no subscriber-initiated programming and no access to the CG hardware or software. Instead, the CGs are provided only with compiled code loaded from flash memory, a hard drive, or EEPROM. Updates to this code are obtained from ICPs and encrypted passwords are stored in hidden, undocumented locations to allow authentication of ICP presence prior to CG control program update. The passwords are changed frequently during an "idle process control" phase and tracked by an ICP.

The second anti-tampering aspect is the provision of a housing for the CGs and a detector consisting of a one or more "deadman" switches that are tripped upon opening the housing or removing a CG's hard drive. The circuit may be either passive or active.

If the detector is passive, it signals an internal controller upon re-start that it has been tripped and causes an event notification sent to an ICP upon next power-up. Upon receipt of the event notification, either the ICP initiates diagnostics and disables the CG if a software tamper has occurred, or the CG disables both its control software and its internal hard drive to prevent the hard drive from operating, until it is returned to the ISP for repair. Subscriber agreements may be used to supply a contract provision specifying that tampering voids the warranty and that the subscriber deeds a portion of the CG to the ISP and agrees to return tampered products to the ISP.

If the detector is active, the "deadman switch" is kept powered by, for example, battery or capacitor. The trip is used to immediately disable the controller software in the processor and the internal hard drive of the CG. Both may be reset only by the ICP, either automatically or by human intervention. These measures prevent subscribers from writing, compiling, executing, modifying, or otherwise tampering with the operating software of the CG. Second, the active mode prevents users from getting access to the content on the hard drive.

In addition to these tamper-proof provisions, all ICP-CG communications take place within the ISP side of the network and ICP-CG communications are secured with encryption and hashing. Furthermore, all CGs must be registered with the ISP. An ICP will not enable any service to an un-registered CG and an un-registered CG will not operate in an experimental environment at all. At the onset of power-up or transition from an inactive to an active state, the CG signals the ICP and the ICP returns an "OK" message prior to proceeding further. This transaction requires an encrypted password exchange to authorize the CG to enter an "active" state where it can play back, download or be used for anything delivering services to users. These measures ensure secure control of the data flow between both the ICP and the CG. This secure flow of data then enables ISPs to effectively and efficiently control the services provided to subscribers.

Reference will now be made in detail to the present embodiments (exemplary embodiments) of the invention, examples of which are illustrated in the accompanying drawings. Wherever possible, the same reference numbers will be used throughout the drawings to refer to the same or like parts.

FIG. 1 illustrates an environment in which the invention may operate. A Service Preference Architecture (SPA) may include at least one Internet Control Point ("ICP") 50 connected to a network 52. Network 52 may be, for example, the Internet, a metro area network, or a local area network, and may include a plurality of SPA-controlled network elements 54 and non-SPA-controlled network elements 55. Network elements 54, 55 may include, for example, network switches and routers. SPA-controlled network elements 54 aid in regulating access and distributing content through network 52.

Also connected to network 52 are content servers including at least one SPA-controlled content server 56 and a plurality of communication gateways ("CGs") 58, including CGs $58_1$, $58_2$, ... $58_n$. A subscriber terminal $60_1$, $60_2$, ... $60_n$ may be connected to each respective CG 58, or in an alternative embodiment not shown, may be combined with each respective CG 58 to form "converged" CGs 58.

An SPA-controlled content server 56 may be, for example, a computing terminal used to deliver content services. A content service may include, for example, delivery of any media file (such as movies, music, pictures, and graphics), software file (such as a complete application, operating parameters, data files, or partial application/updates) or a real time application (such as interactive data processing, voice communications or visual communications to an end user). In an alternative embodiment, the functions of SPA-controlled content server 56 and ICP 50 may be combined in a single component.

ICP 50 is typically located remotely from subscriber terminals 60 and regulates both subscriber access to network 52 and distribution of content in network 52. The content may originate from SPA-controlled content server 56, for example, or from other content servers 57 in network 52. ICP 50 works in conjunction with CGs 58 and SPA-controlled network elements 54 by generating instructions which are transmitted over network 52 to CGs 58 and SPA-controlled network elements 54, where the instructions are executed.

ICP 50 may constitute the source of internet service control and conditional denial of subscriber access to ISP-selected URLs or IP addresses. ICP 50 may control CGs 58 to determine what web site data is allowed to pass through to subscribers using, for example, web browser programs executing in subscriber terminals 60. ICP 50 may also control packet inspection processing in CGs 58 to determine which data can be allowed to flow through CGs 58 to and from subscriber terminals 60, specifically when e-mail or file transfers are initiated. ICP 50 also controls what activities are engaged in by idle CGs 58 when corresponding subscriber terminals 60 are inactive. Idle CGs 58 may receive software downloads from ICP 50, collect data, and initiate communications activities that are disruptive to certain non-SPA content servers 57 that offer unauthorized copyrighted materials for illegal download by subscribers. Multiple ICPs 50 may be deployed geographically in an ISP's network to support the CG management capacity of ICP 50 and the number of subscribers in its service area.

An ISP may provide an ISP portal 62 to facilitate subscriber access to network 52. ISP portal 62 may be, for example, an enterprise data center. Access node 66 is associated with the ISP providing ISP portal 62. ICP 50 interacts with ISP portal 62, ISP associated access node 66, and SPA-controlled content server 56 to control subscribers' ability to access services that are offered by ISP portal 62. ICP 50 also controls CGs 58 to deliver various services, including, for example, advertisements, the home page for ISP Portal 62 or SPA-controlled content server 56 web servers, or software downloads to subscriber terminals 60 for their use of ISP 62 or SPA-controlled content server 56 services.

ICP 50 also interacts with SPA-controlled network elements 54 used by ISP portal 62 to deliver services. ICP 50 controls subscribers' ability to access services that are offered by the ISP portal 62 and controls the operation of the services themselves by controlling the flow of data through SPA-controlled network elements 54 used by ISP portal 62.

ICP 50 may be programmed either by human input or by operator-controlled web crawler software. Updates to a database in ICP 50 may be provided by an active intervention system 64 whereby changes to ICP 50 database entries are discovered and implemented. The updates to ICP 50 database may be made in a manner analogous to the regular updating of virus definitions for computer virus and worm protection.

The web crawlers, human intervention, and ICP 50 and CG 58 database updates may be controlled by active intervention system 64. Active intervention system 64 may include, for example, a set of centrally maintained computer systems. Active intervention system 64 may control the operation of various geographically deployed ICPs 50.

The process begins with active intervention system 64. Active intervention system 64 is used by human operators to discover new URLs or IP addresses to "pirate" sites to conditionally deny access to these URLs or IP addresses by CGs 58, discover changes needed to implement Digital Rights Management (DRM) techniques, discover and record new packet characteristics, install wiretaps as ordered, process new copyright registry entries, change encryption techniques, and perform other management services. ICPs 50 then deliver active and real time executed network management, distribute new database entries and software changes to CGs 58 and track operation of the SPA-controlled network elements 54. Although one ICP 50 is illustrated there may be more. Thus, multiple ICPs 50 may be networked together to enable them to manage large numbers of SPA-controlled network elements 54 and provide redundant, highly reliable operation. Furthermore, ICPs 50 may all use identical databases to enable uninterrupted network management.

Figure 2:
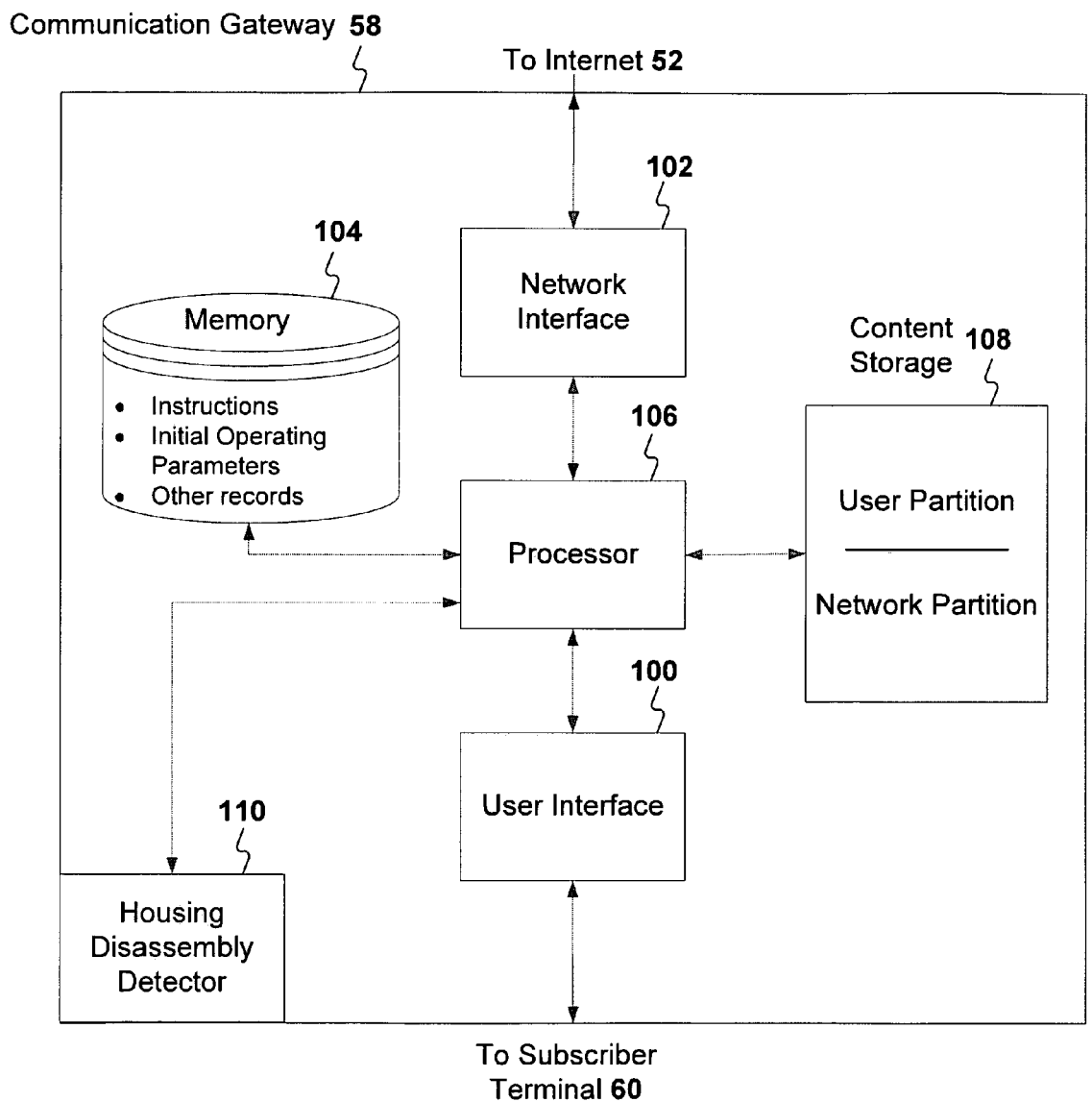
FIG. 2 depicts a communication gateway consistent with the present invention.

As illustrated in FIG. 2, a CG 58 may include a user interface 100 that receives subscriber requests, entered by subscribers at an associated subscriber terminal 60, to access network 52. CG 58 may also include a network interface 102 to exchange data with network 52 and to receive instructions from ICP 50; a memory device 104 including a database for storing ICP-generated instructions, initial operating parameters, and other records; a processor 106 to implement the instructions; a content storage device 108 having a user partition and a network partition for storing content; and a housing disassembly detector 110 to prevent tampering, as described above. Memory device 104 may be, for example, a bank of one or more semiconductor memories, a bank of one or more hard disk drives, a combination of semiconductor memories and hard disk drives or any other device that holds data. Processor 106 may be, for example, a general purpose processor (such as a Pentium 4 processor, an integrated circuit, or collection of integrated circuits) that can execute program instructions and is designed to allow control of CG 58 to be implemented in purely software and may also be used for non-CG related general purpose computing applications, or processor 106 may be a special purpose processor (integrated circuit or collection of integrated circuits) that can execute program instructions and is designed with only the power, bus, memory, logic and hardware accelerators needed to control CG 58. Content storage 108 may be, for example, a bank of one or more semiconductor memories, a bank of one or more hard disk drives, a combination of semiconductor memories and hard disk drives or any other device that holds data. CGs may be provided in various forms, such as, for example, a gateway module that combines TV, video, internet and voice access, a dial-up remote access server, an ADSL modem/router, a satellite TV gateway, a cable TV modem, a converged set top-plus-internet gateway, a wireless modem, or other fixed or mobile computing, playback, recording, display or communications device including radio, TV, stereo, wireless phone, phone, DVD, VCR, WLAN access point, wireless broadband or narrowband modem, or similar device.

Figure 3:
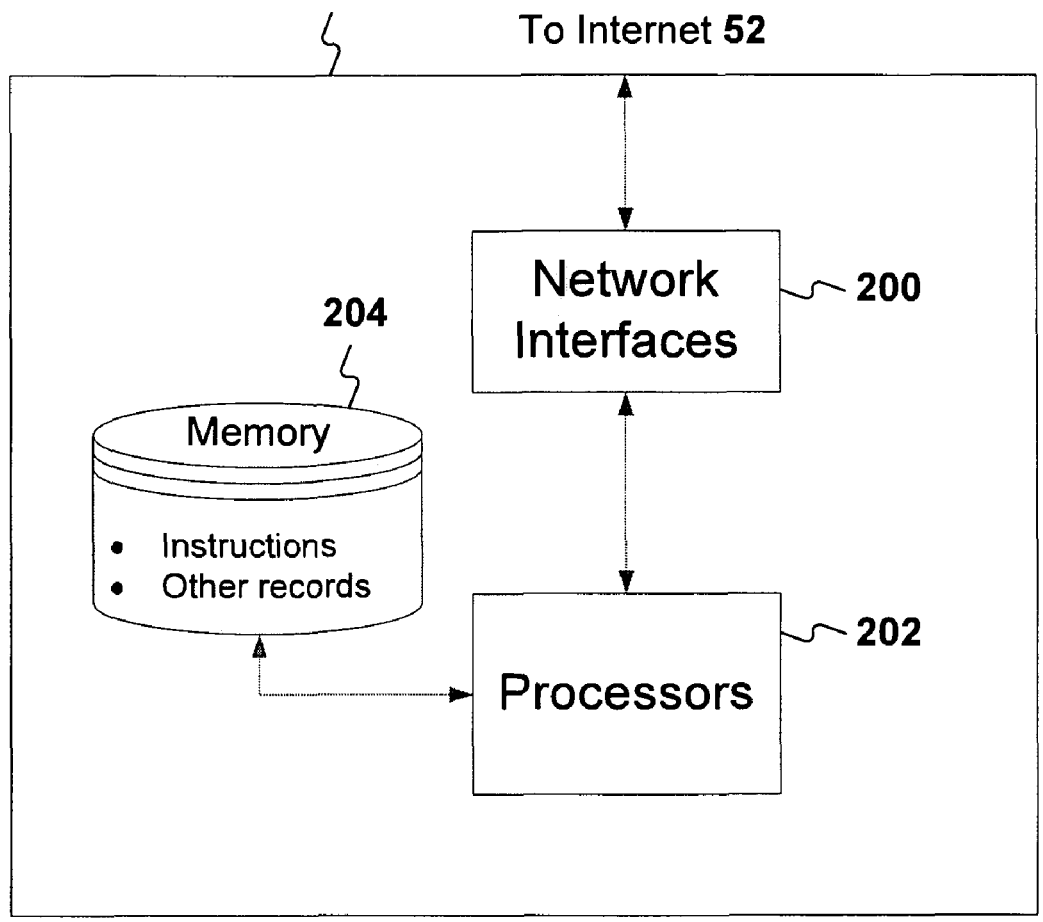
FIG. 3 depicts an internet control point consistent with the present invention.

As illustrated in FIG. 3, an ICP 50 may include one or more network interfaces 200, one or more processors 202, a memory device 204 including a database for storing records, and a non-internet communications link for traffic between processors and shared storage and memory. The records preferably include instructions that may be updated by active intervention system 64 and distributed to CGs 58 and SPA-controlled network elements 54 for execution.

Figure 4:
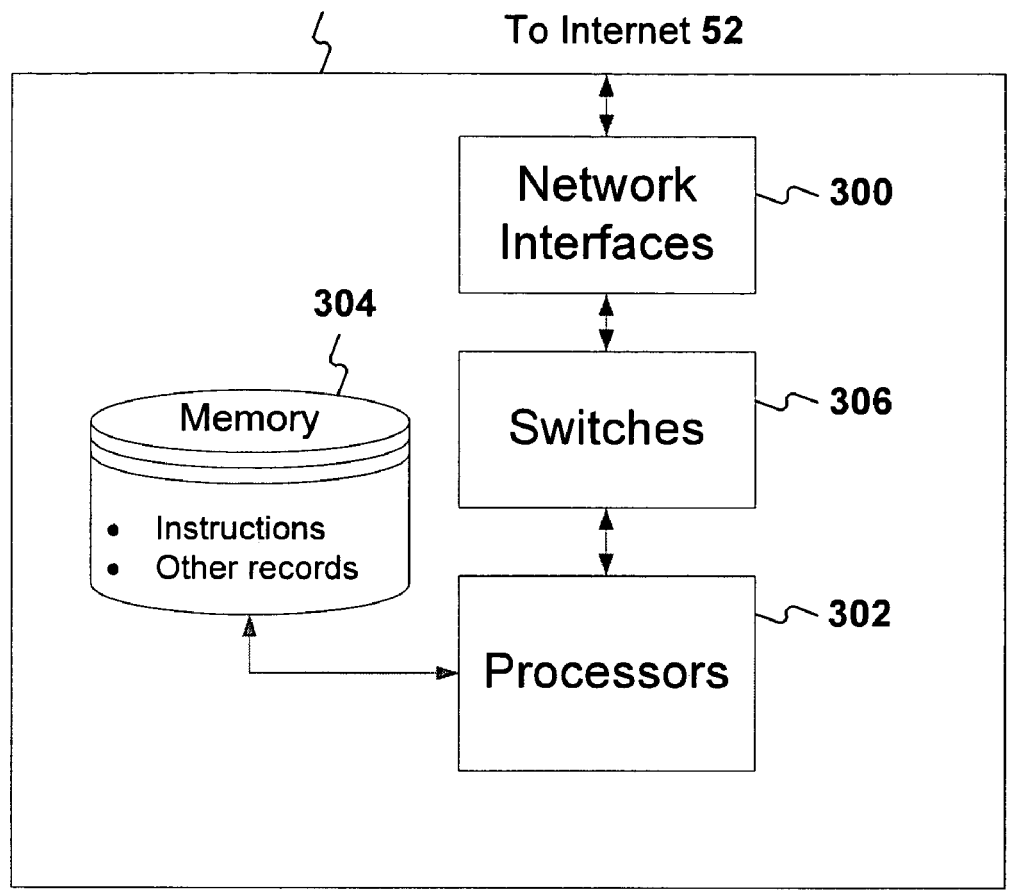
FIG. 4 depicts a network element consistent with the present invention.

As illustrated in FIG. 4, SPA-controlled network elements 54 may include one or more network interfaces 300, one or more processors 302, a memory device 304 including a database, and one or more switch modules 306 for providing routing and switching services. Components 300, 302, and 304 may operate in a similar fashion to the corresponding components of the CGs. SPA-controlled network element 54 may be provided in various forms, such as, for example, a computer used to deliver data services or content services, a core router or ATM switch, a subscriber management system used to control access to the network, authenticate subscribers or devices before allowing access into the network, a DSLAM, cable modem system, wireless modem system, or any other multiplexing or channel service delivery system, or a satellite that incorporates any of these elements.

Service Initialization

CGs 58 may be required to register with ICP 50 when they are powered up for the first time. CGs 58 will remain inactive until they receive a registration confirmation from SPA-controlled content server 56 or ICP 50. The registration process may include collection of information by ICP 50 for a warranty registration from the subscriber such as, for example, CG's 58 hardware address and other identifying data. ICP 50 will then send CG 58 the latest operating software, if necessary, and its initial operating parameters to load in memory 104. Initial operating parameters may include, for example, the address of the CG's 58 ICP 50 and other variables as described below. Subsequent re-registrations may be initiated by CG 58 under subscriber control for address or ISP changes.

Active and Inactive CG Processing Control

Upon power down or inactivity timeout of CG 58, CG 58 may register itself as "idle" by sending an event notification to ICP 50. The duration of an inactivity timeout may be preset and may be changed by input to ICP 50 for distribution to all CGs 58 under the control of ICP 50.

Upon subsequent re-activation, which may be initiated by either power up or signals from subscriber terminal 60, CG 58 identifies itself as "active" by sending an event notification to ICP 50, which responds with an acknowledgement. Failure of a CG 58 to receive an acknowledgement results in a series of re-tries until finally a timeout or maximum number of re-tries occurs. When this occurs, a diagnostic program may be executed in CG 58 to advise the subscriber what to do next, based on the deduced source of the failure. Active CGs 58 may process and control delivery of content and services from SPA-controlled content server 56 or ISP portal 62. Inactive CGs 58 may process and control either CG maintenance or may carry out activity delegated to inactive CGs by design.

Conditional Denial

Figure 5:
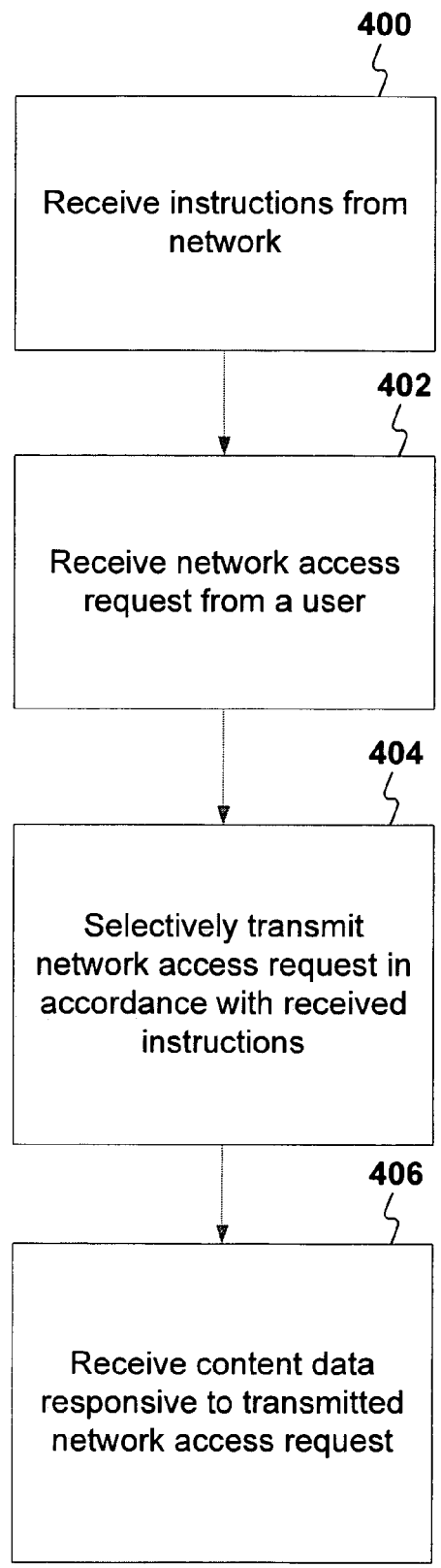
FIG. 5 is a flow chart of a method for selectively transmitting network access requests consistent with the present invention.

FIG. 5 shows a method, consistent with the invention for regulating user access to a network. In step 400, a gateway unit associated with a user receives controller instructions from the network. Next, at step 402, the gateway unit receives a network access request from a user, via a subscriber terminal. At step 404, the gateway unit selectively transmits the network access requests over the network in accordance with the controller instructions. Finally, at step 406, the gateway unit receives content data responsive to the transmitted network access request from the network. Consistent with the present invention, this section, and others that follow, describe in more detail the implementation of this method.

CGs 58, under ICP 50 control, may provide a network-based Digital Rights Management (DRM) service. The DRM service denies subscribers the capability to send or to receive data from or to "pirate" URLs or IP addresses that are known to contain unlicensed copyrighted material. In implementing this denial, CG 58 deletes the "pirate" URL or IP address and substitutes the URL or IP address of a site that offers licensed copyrighted materials for legal, authorized sale. The list of "pirate" URLs or IP addresses that are known to contain unlicensed copyrighted material may be regularly updated, similar to the manner in which virus definitions are regularly updated.

Furthermore, when other non-web browser programs executing in subscriber terminals 60 attempt to access a blocked site, the request to the URL or IP address of the blocked site may be redirected to a legal content provider's URL or IP address or ignored.

Upon registration of a CG 58 as "active," ICP 50 may update the list in CG 58 of DRM URL or IP address substitutions.

Packet Inspection

CGs 58 and SPA-controlled network elements 54 may perform packet inspection to determine the file type of all files being transferred through CG 58 or SPA-controlled network elements 54, based on file properties, including, for example, file extension, file format, header or trailer contents and URL/IP addresses that are known sources of unauthorized copyrighted material. ICP 50 programs CGs 58 and SPA-controlled network elements 54 with certain data patterns. These data patterns may be any length and may contain exact matches or regular expressions. When certain data patterns are recognized, the data transfer may be stopped or another action may be taken, based on instructions delivered by ICP 50.

E-Mail Server & Client Spoofing

A CG 58 or the first SPA-controlled network element 54 capable of switching traffic inside the network may present itself to the subscriber terminal 60 as the associated subscriber's e-mail server, which may be a network element 54. In addition, the CG 58 or the first SPA-controlled network element 54 capable of switching traffic inside the network may present itself to the subscriber's e-mail server as a subscriber terminal 60. In this manner, CG 58 or the first network element 54 capable of switching traffic inside the network acts as a two-way encryption/decryption point to enable inspection of what would otherwise be encrypted data. When e-mail is sent through CG 58 or the first network element 54 capable of switching traffic inside the network, all attached files are inspected using, for example, packet inspection techniques described above. Based on ICP-delivered instructions, CG 58 or the first network element 54 capable of switching traffic inside the network may then deny access to incoming files, stop transfer of outgoing files, or take other action.

Browser, Program Communications, & URL or IP Address Access Blocking

Under control of ICP 50, CG 58 may block subscriber access to a list of URLs or IP addresses. When CG 58 registers with ICP 50 as "active", CG 58 receives from ICP 50 an update to its list of denied URL or IP addresses and its substitute list. The substitute list includes, for example, URLs or IP addresses to be substituted for certain URLs or IP addresses denied to the subscriber by CG 58. A subscriber-entered request in a web browser program to display a denied URL or IP address or a program call made by a program running on subscriber terminal 60 to connect to a denied URL or IP address may be allowed to time out. Alternatively, CG 58 may present a substitute URL or IP address from its substitute list to be displayed to the subscriber. Time-out may occur when no substitute URL or IP address exists. An ISP may optionally allow a subscriber to submit entries to the list of denied URLs or IP addresses for parental control purposes. Converged CGs 58 may also use this blocking feature to grant access and deliver only ISP-provided video services that subscribers have subscribed to, excluding all others. This blocking feature may also be used to block web sites for public policy, court-ordered or ISP policy purposes.

Event Notification

CGs 58 and SPA-controlled network elements 54 deliver an event notification to ICP 50 whenever a packet inspection match is made or an attempt to access a conditionally denied URL is detected.

Virus-Initiated Denial of Service Traffic Blocking

Repeated and rapid attempts to send data to one or a short list of URLs or IP addresses by any subscriber terminal 60 served by CG 58 are detected by CG 58 and traffic to the identified sites is not forwarded.

Voice over Internet Protocol (VoIP) Blocking

For subscribers who are not VoIP subscribers, CG 58 or SPA controlled network elements 54 may identify attempts to use VoIP services by recognizing destination URL, source URL, packet length, header information or packet contents. Incoming or outgoing VoIP packets may be discarded and an advertisement offering VoIP subscription service may be delivered and displayed to subscriber terminal 60.

Real Time Video or Audio Streaming Blocking

For subscribers who are not real time quality-of-service subscribers, CG 58 or SPA controlled network elements 54 may identify attempts to use real time applications by recognizing destination URL, source URL, packet length, header information or packet contents. Incoming or outgoing real time packets may be discarded and an advertisement offering a real time streaming subscription service may be delivered and displayed to subscriber terminal 60.

Real Time Video or Audio Quality-of-Service (QoS) Reduction

For subscribers who are not real time quality-of-service subscribers or who attempt to access portals that are known to offer illegal P2P file sharing, CG 58 or SPA controlled network elements 54 may identify real-time applications by recognizing destination URL, source URL, packet length, header information or packet contents. Upon identification, CG 58 or SPA controlled network elements 54 may reduce the speed with which traffic is delivered through reducing the duty cycle at which data is transferred. This may be done by insertion of TCP/IP messages, Nak/Ack or X-On/X-Off pairs. An advertisement offering real time QoS subscription service may be delivered if the site requested is not a known illegal P2P site.

Internet or Data Network Access Authentication

This technique prevents subscribers from substituting foreign gateways and logging on to Internet (broadband or narrowband remote) access servers without controls on their data flow.

After ICP 50 has authorized the flow of data through a CG 58, ICP 50 may send authorization instructions to access node 66 associated with the ISP providing ISP portal 62. Access node 66 may be, for example, an internet access server or subscriber management system. The authorization instructions must be received by access node 66 before the subscriber may be authenticated and granted internet access.

Figure 6:
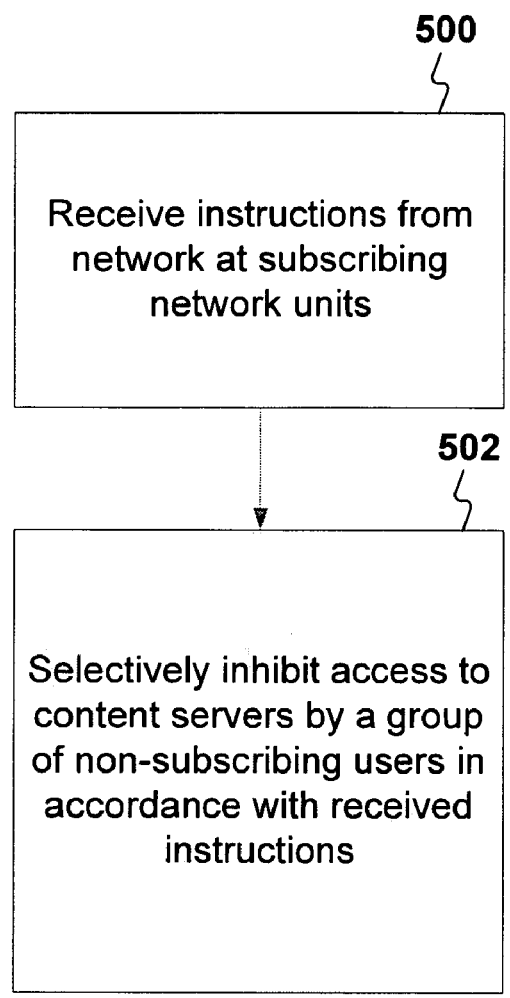
FIG. 6 is a flow chart of a method for inhibiting access to content servers on a network consistent with the present invention.

Denial of Service and Spoofing Attacks on Sites Distributing Unlicensed Copyrighted Material A method, consistent with the invention, for regulating user access to a plurality of content servers in a network is shown in FIG. 6. First, at step 500, a network unit associated with a first group of users receives controller instructions from the network. Next, at step 502, the network unit selectively inhibits access to a portion of the content servers by a second group of users in accordance with the controller instructions. Consistent with the present invention, this section describes the implementation of this method in more detail.

Network units, including, for example, powered up and inactive CGs 58 and SPA-controlled network elements 54, may be directed by instructions received from an ICP 50 to initiate repeated requests for service or other similar transactions to URLs or IP addresses of "pirate" sites, that is, sites that have been identified for interdiction in an ICP-delivered conditional denial of service list. ICP 50 may activate such attacks on any of several bases: "scheduled with duration," "real time activated" by ICP 50, or "event driven." When attacks are "scheduled with duration", ICP 50 directs CG 58 to attack at a certain time and attack for a specified time interval. When attacks are "real time activated," ICP 50 directs CG 58 to immediately begin or end attacks. When attacks are "event driven," ICP 50 directs CG 58 to begin attacks upon instance of an event, such as entering inactive state. A "scheduled with duration" attack may be combined with an "event driven" attack so that an attack begins upon instance of an event and ends after a time interval specified by ICP 50. In this way, subscribers not served by CGs 58 under ICP 50 control may also be denied access to copyrighted materials. Thus, the impact of initially deployed CGs 58 greatly expands to prevent access to pirated material in network 52.

In addition to directing denial of service attacks on URLs or IP addresses in the conditional denial of service list, ICP 50 may direct CGs 58 and SPA-controlled network elements 54 to perform similar attacks on URLs or IP addresses identified by a government or law enforcement body including, for example, the Department of Defense. This technique would be desirable when, for example, an identified URL or IP address is being used to plan dangerous criminal or terrorist activities.

Many P2P servers facilitate the distribution of unlicensed copyrighted content. Human operators using active intervention system 64 may discover the IP address or URLs of such servers. This may be accomplished via several methods, including, for example, subscribing to P2P services or using P2P software from multiple sources.

The files being shared via P2P resource address servers may then be examined by the human operators to discover which Internet servers contain links to unlicensed copyrighted content. The URLs and IP addresses of P2P servers offering or containing links to unlicensed copyrighted material may be blocked by placing them on a blocked address list maintained by ICP 50.

Human operators then use active intervention system 64 to enter spoofing attack instructions by uploading to various P2P resource address servers substitute file pointers. The substitute file pointers specify to the servers the identities of what are supposedly unlicensed copyrighted files and redirect access requests from P2P users seeking the unlicensed copyright files to substitute files. Network units, including, for example, powered up and inactive CGs 58 and SPA-controlled network elements 54, may also be directed by instructions received from an ICP 50 to upload substitute file pointers to various P2P resource address servers.

The substitute files may be, for example, non-working or defectively working files or may contain messages informing the user that access has been prevented and that legal copies may be obtained elsewhere.

Copyright Registry

A registry is centrally kept and enabled access by ICP 50. Subscribers who have purchased copyrighted material may be registered by the seller or may self-register as owners of a license to use the material. Furthermore, non-copyrighted material may be registered in order to identify files having no limit on the number of copies made or that may be e-mailed or downloaded without intervention.

Copyrighted File Deletion

A powered-up inactive CG 58 may, under ICP 50 control, inspect the computer file system associated with any subscriber terminal 60 available to it on the network to which CG 58 is attached. CG 58 may notify ICP 50 of file names that match packet inspection patterns to identify the presence of copyrighted material to which the associated subscriber may not be entitled. Human intervention via active intervention system 64 or, alternatively, the copyright registry, may be used to verify a subscriber's entitlement to copyrighted materials found on the subscriber's file system. If no entitlement is found, a CG 58 associated with the file system may then delete the files to which the subscriber is not entitled.

First Portal Visibility ("First Portal")

The "first portal" feature is used to present to subscribers a specific URL, with content specified by the ISP, as the "first portal" page to be displayed to a subscriber upon launch of a web browser regardless of the subscriber's selection as "home" in the web browser program running on subscriber terminal 60. CG 58 delivers the "first portal" under ICP 50 direction. The "first portal" may be selected from a list of URLs or IP addresses upon web browser launch or resumption of activity when, for example, an inactivity timeout has occurred. ICP 50 may periodically change the list of URLs or IP addresses delivered to CG 58. CG 58 receives the subscriber's URL requests via user interface 100 and delivers instead the "first portal" URL. The subscriber may be presented with a rotational scroll of URLs or IP addresses, in which each URL in the ICP-delivered list of URLs or IP addresses is presented in round robin fashion each time a new "first portal" opportunity is created. Alternatively, the list received from ICP 50 may consist of one URL or the URLs or IP addresses in the list may be processed by a weighting function so that some URLs appear more often than others. The specific weighting function may optionally be configured by an ISP.

Advertising

Under control of ICP 50, ISP portal 62 may present a set of generalized and/or customized advertisements to subscriber terminal 60 during the presentation of pages from the "first portal" URL and during events specified by ISP portal 62. CG 58 may receive, via network interface 102, a list of advertisements or URLs or IP addresses from ICP 50 to be presented to the subscriber associated with subscriber terminal 60. Ads can be customized by ICP 50 based on ISP input, subscriber input, zip code, URLs or IP addresses viewed by subscribers. A set of events that trigger the ad presentation to the browser on subscriber terminal 60 may be transferred from ICP 50 to CG 58 under operator control. Events may be time triggered or may include such things as new URL or IP ADDRESS requests or commencement or completion of data transfer. Advertising may be delivered via pop-up windows, browser windows, e-mail messages or physical media sent to subscriber terminal 60.

Service Applet Downloads

Subscribers who subscribe to fee-based services such as video calling, games or gambling may receive applet downloads from ICP 50 or from SPA content server 56. The applet downloads may then be loaded to an associated subscriber terminal 60 or network appliance/controller. The applets are typically the resident software required for the service. CG 58, under ICP 50 control, may restrict the applet download to only the services subscribed to by the subscriber. Applet updates may be delivered to a subscriber when they are on-line and CG 58 is registered with ICP 50 as active.

Law Enforcement Monitoring

Law enforcement or national security agencies worldwide have interests in monitoring use of the Internet and e-mail during "threat" situations. Such agencies are also charged with gaining access to Internet communications under legal warrants. With this feature, some or all data flowing through CG 58 or SPA-controlled network elements 54 may be copied to specific law enforcement or national security monitoring sites (not shown in figures). To send only a portion of traffic, the data stream may be monitored by a packet inspection engine at CGs 58 or SPA-controlled network elements 54 to sniff IP addresses or data and send selected traffic to appropriate agency sites. The monitoring is activated by a human interaction with ICP 50 via active intervention system 64 and monitoring instruction are then sent to the appropriate CG(s) 58 or SPA-controlled network element(s) 54.

Pay Per View (PPV) Advertising

This technique allows subscribers to view advertising in a searchable format. The advertisements may be video, text, audio or a combination of two or all three media formats. A search result showing short descriptions of returned advertisements may be presented to the subscriber. The subscriber may then select an advertisement they are interested in viewing or listening to.

When packaged with a video delivery service, subscribers may generally skip advertisements that are embedded in the video programming and may search advertisements with text input and receive advertisements that match their interest. For each advertisement viewed, the subscriber may be paid for viewing it. Payment may be nominal and used to stimulate high penetration of advertisement viewing by interested subscribers who are actually shopping and buying products presented in the advertisements.

Playback of advertisements may be in a "click and play" mode, a "short play and skip to the next" mode or a "play until I say stop" mode. Conversion between playback modes may be controlled by the subscriber.

PPV Advertisers may purchase placement high up in the listings. Subscribers may input weighting to search terms to raise or lower the placement order of advertisements for the display of search results.

When PPV Advertising is packaged with audio delivery service, the audio equivalent to display weighting by the subscriber may be delivered by use of subscriber terminal 60 or a remote control. A subscriber may select a continuous playback of advertisements mode or a "listen and skip" mode to allow the subscriber to listen to any portion then skip to the next advertisement.

Text may be added to either video or audio services by use of a display embedded in the advertisement playback device.

Figure 7:
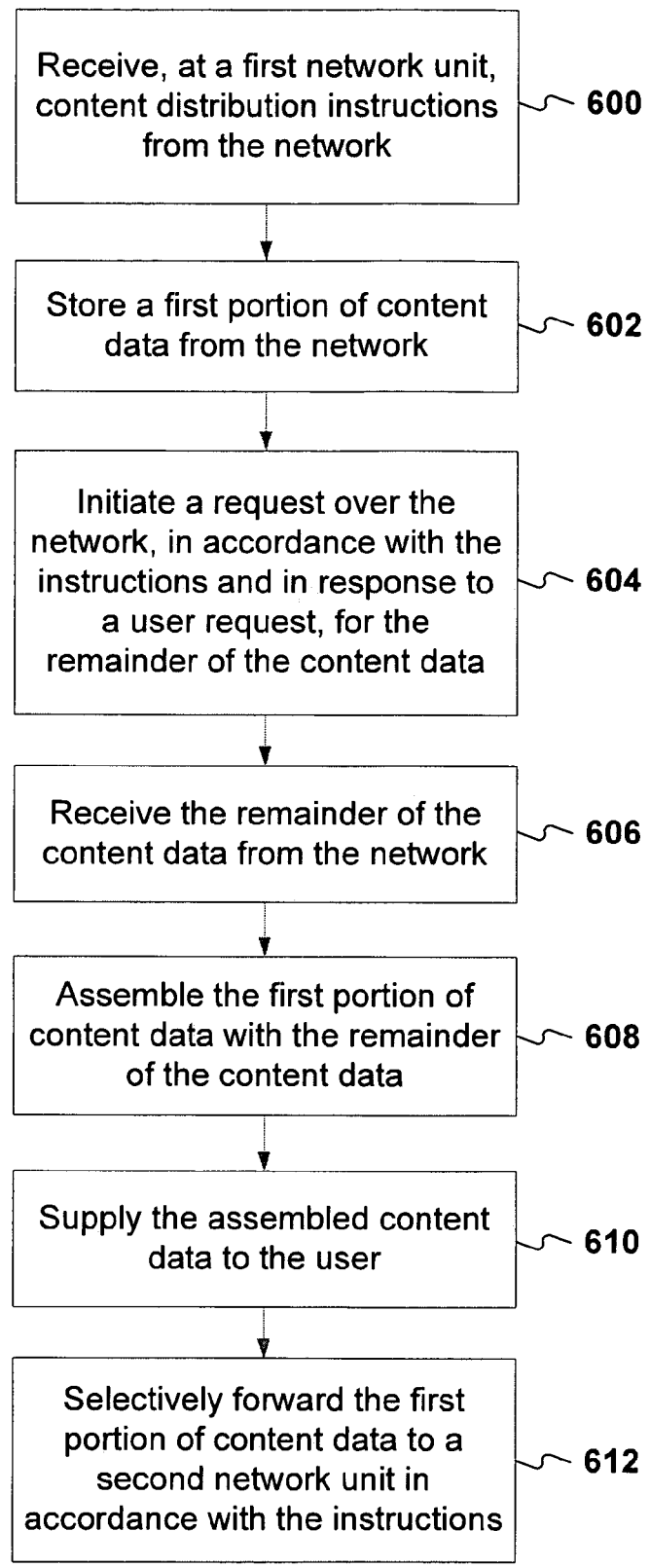
FIG. 7 is a flow chart of a method for distributing content in a network consistent with the present invention.

Efficient Content Delivery Using CG Based Caching/Storage and Access Network Bandwidth for Content Service Delivery A method, consistent with the invention, for distributing content data over a network is shown in FIG. 7. First, at step 600, a first network unit receives content distribution instructions from the network. Next, at step 602, the first network unit stores a first portion of content data from the network. Next, at step 604, the first network unit initiates a request over the network, in accordance with the content distribution instructions and in response to a user request, for the remainder of the content data. At step 606, the first network unit receives the remainder of the content data from the network. Then, at step 608, the first network unit assembles the first portion of content data with the remainder of the content data.

At step 610, the first network unit supplies the assembled content data to the user. Finally at step 612, the first network unit selectively forwards the first portion of content data to a second network unit in accordance with the content distribution instructions.

In more detail, consistent with the present invention, this method combines the use of network units, such as CGs 58, that store a portion or slice of content being delivered with ICP control of content delivery so that CGs 58 are used to deliver content to one another from their small slice of content upon request by subscribers. SPA-controlled content server 56 first receives all the incoming content. SPA-controlled content server 56 may be composed of any number of platforms. The incoming content may be video, music, books, software, games and so forth. Subsequent to receipt of the content, SPA-controlled content server 56 then distributes a sufficiently large fraction of the content for storage within CGs 58 within its subscriber network so as to reduce demand for data communication through its network connection. Individual CGs 58 receive controller instructions from ICP 50 and a small slice or portion of the total content. The slices of content thus downloaded to CGs 58 approach 100% of the content delivered. The slices of content thus downloaded are stored in a network partition of content storage 108 within each CG 58 to which SPA-controlled content server 56 has the only "write" permission and to which subscribers have only "read" permission and then only by request for the content and as directed to download the content from CG 58 or from SPA-controlled content server 56 to CG 58 by the ICP 50. Content requested by subscribers may also be stored on this network partition of content storage 108. A subscriber may have permission to delete content as a result of that subscriber's request. All subscriber "deletes" may be allowed immediately or delayed to a later event by ICP 50, based upon the need to distribute the content from CG 58 to additional CGs to satisfy other subscriber requests. The IP address and other unique identifying information about which CG 58 holds which portion of content is tracked by SPA-controlled content server 56 and ICP 50. This technique furthermore parses each individual file into smaller chunks and then places them in several sets of CGs 58 so as to place several "seed CGs" within the network that contain the same content. In this way, a storm of packets may be created that overcomes the imbalance between upstream and downstream bit rate speeds delivered to CGs 58. Many CGs with lower upstream (CG to network) rates can download data to a CG requesting a download with a higher downstream (network to CG) rate. In addition, SPA-controlled network elements 54 may aid in distribution of content by storing seeds, or slices of content, to be distributed so as to reduce demand on SPA-controlled content server 56.

In response to a subscriber's request for content, the subscriber may have access to all content stored on the network partition of both their own CG and other CGs under control of ICP 50. When many subscribers request the same content, then ICP 50 directs a replication of content as it is distributed to CGs 58. "Replication" is a technique whereby the first CG to receive specific content forwards that content to other CGs. These other CGs may, in turn, download content to several subsequent CGs. Thus CG 58 selectively forwards the portion of the content file in accordance with instructions received from ICP 50. In this manner, all CGs receive content in a shorter period of time. ICP 50 directs content to be delivered to the requesting subscriber's CG from SPA-controlled content server 56 if the file is not available from any other CG. Once a content file is resident in CG 58, the associated subscriber may select it for playback. Content is either displayed on consumer electronics, displayed on subscriber terminals 60 or delivered to other terminals, as allowed by the content's license grant. Content delivered at a subscriber's request will be stored on the network partition of that subscriber's CG 58. Playback, use of content with consumer electronics, and/or file transfer may be allowed, in accordance with the license grant.

ICP 50 keeps track of which CGs 58 are powered up and are active and available. ICP 50 also keeps track of the content that was written to the active CGs by SPA-controlled content server 56. Content may be purged from the CG network partitions on a regular basis by several methods. First, a "deletion date" may be used for each content file. Second, SPA-controlled content server 56 may purge content when new content is delivered, with SPA-controlled content server 56 notifying CG 58 of the purge. Third, the oldest content may be purged if space in the network partition is too small to accept new content. Fourth, subscribers may delete content previously downloaded at subscriber request.

CG 58 may also contain a user partition in which a subscriber may store his or her own content. The content stored in a user partition may be any file, including, for example, media, software, and data files. The content stored in a user partition may also be accessed by subscribers via subscriber terminal 60 or may be transferred to various consumer electronics at the subscriber location to be played or displayed.

ICP, CG, and Network Element Database Structures

Each ICP 50 may keep a master database used for control of SPA-controlled content servers 56, CGs 58, and SPA-controlled network elements 54. The master database may be managed by a database system that is accessed by ICP software. Preferably, no storage space is allocated for record fields with null content. Each CG 58, network element 54, and SPA-controlled content server 56 may also keep a subset of the master database for use in processing.

The following sections describe the various types of data kept in ICP 50 master database and in CG 58, network element 54, and SPA-controlled content server 56 databases.

Individual Managed CG, Network Element, Content Server and Provider/Subscriber Identifiers ICP 50, CG 58, network element 54, and SPA-controlled content server 56 databases may each contain hardware records. ICP's 50 master database records may include an active record for each CG 58, network element 54, and SPA-controlled content server 56 managed by ICP 50 with a "history archive" including up to ten past records to account for subscriber, ISP portal 62, network element 54, CG 58, and SPA-controlled content server 56 software changes. The information in master database records may include, for example, subscriber/contact name, company name, address, city, state, country, post code, telephone number, e-mail address, hardware addresses of CG 58, SPA-controlled network element 54, or SPA-controlled content server 56, unique identifiers of CG 58, SPA-controlled network element 54 or SPA-controlled content server 56, model number, serial number, hardware release version, software release version, law enforcement copy to URLs, events logged from CG 58, network element 54 or SPA-controlled content server 56, authentication pre-authorization URL or IP address, active process image ID, inactive process image ID, active/inactive flag, real time QoS Flag, and VoIP QoS Flag.

CG 58, network element 54, and SPA-controlled content server 56 database records may each include their own individual corresponding identifying information.

Current Production Software Versions and Images by CG, Network Element or Content Server Model This record is kept only in ICP 50 master database. The following fields may be kept in the master database record for each managed CG 58, network element 54 or SPA-controlled content server 56: model number, hardware release version, software release version, current code image, last two code images, and release notes for customer support.

Managing ICP List

The managing ICP list data is kept only in CG 58, SPA-controlled network element 54, and SPA-controlled content server 56 databases. This data includes a list of URL or IP addresses for ICPs 50 that can control the associated CG 58, network element 54, or SPA-controlled content server 56. The first entry is permanent and allows for initial registration and download of ICP addresses for the ISP associated with the specific CG, network element, or SPA-controlled content server.

Active Process Image List

ICP 50, CG 58, network element 54, and SPA-controlled content server 56 databases each contain active process image list data. Active processes are sub-routines that may be executed by the production software running on each CG 58 when the CG is in an active state. The active processes can be changed by ICP 50, without changing the current production software, whenever a CG 58, SPA-controlled network element 54, or SPA-controlled content server 56 performs an "I'm Active" login. Copies of active process routines may be downloaded to CGs 58, SPA-controlled network elements 54, or SPA-controlled content servers 56, as directed by an image distribution routine applied to ICP 50 by human input at active intervention system 64. A human operator may identify a set of "unique identifiers" that may be loaded with each specific active process. The active process image list may be null.

Idle Process Image List

ICP 50, CG 58, network element 54, and SPA-controlled content server 56 databases may each contain idle process image list data. Idle processes are sub-routines that may be executed by the production software running on each CG 58 when the CG is in an active state. The idle processes can be changed by ICP 50, without changing the production software, whenever a CG 58, SPA-controlled network element 54 or SPA-controlled content server 56 performs an "I'm Idle" login. The idle process images are downloaded to CGs 58, SPA-controlled network elements 54, or SPA-controlled content servers 56 as directed by an image distribution routine applied to ICP 50 by human input at active intervention system 64. The human operator may identify a set of "unique identifiers" that may be loaded with each specific idle process. The idle process image list may be null.

P2P Idle Process Attack URL List

P2P idle process attack URL list data is kept only in ICP 50 and CG 58 databases. The data contains a list of URLs or IP addresses of sites containing illegally distributed unlicensed materials that may be attacked by the idle process. The list may be null. This list contains a set of flags to define the type of content the illegal sites are known by active intervention system 64 to offer.

Department of Defense (DOD) Idle Process Attack URL List

DOD idle process attack URL list data is kept only in ICP 50, CG 58, and SPA-controlled network elements 54 databases. This is a list of URLs or IP addresses, generated by DOD, of sites that are to be attacked during the idle process. The list may be null.

"First Look" URL List

"First look" URL list data is kept only in ICP 50 and CG 58 databases. The data contains lists of URLs or IP addresses that will be presented to subscribers with the "first portal" browser screen. This list may be null, or may have one or more entries. Multiple entries may be cycled through by a routine built into ICP 50 or CG 58 software.

Advertisement Insertion URL List

Advertisement insertion URL list data is kept only in ICP 50 and CG 58 databases. The data contains a list of URLs or IP addresses that are presented to subscribers as "advertising" browser screens. This list may be null, or may have one or more entries. Multiple entries may be cycled through by a routine built into CG 58.

Legal Content URL List

Legal content URL list data is kept only in ICP 50 and CG 58 databases. The data contains a list of URLs or IP addresses that are presented to subscribers as legal content sites when they attempt to connect their browser to a URL or IP address that is on the "P2P Blocked URL" List. This list may be null, or may have one or more entries. Multiple entries will be cycled through by a routine built into the CG 58. The content flags from the P2P Blocked URL list are used by active CG 58 or SPA-controlled content server 56 processes to present the subscriber with a browser screen containing links to "Legal Content URLs" that match what the subscriber tried to access.

P2P Blocked URL List

P2P blocked URL list data is kept only in ICP 50 and CG 58 databases. The data contains a list of URLs or IP addresses of sites containing illegally distributed unlicensed materials that are to be blocked from access by the active process. The list may be null. This list contains a set of flags to define the type of content the illegal sites are known by active intervention system 64 to offer. The flags are used by CG 58 software to present a browser screen to subscribers containing "Legal Content Sites" that offer similar content to what the P2P Blocked URL offers when they try to point their browser to a site on this list.

P2P QoS Restriction URL List

P2P QoS restriction URL list data is kept only in ICP 50 and CG 58 databases. The data contains a list of URLs or IP addresses of sites containing illegally distributed unlicensed materials whose throughput to and from subscribers is to be severely constricted by the active process. The list may be null. This list contains a set of flags to define the type of content the illegal sites are known by active intervention system 64 to offer. The flags are used by CG 58 active software to present a "first portal" or advertising browser screen to subscribers containing "legal content sites" that offer similar content to what the P2P QoS restricted URL Offers.

Portal Blocked URL List

Portal blocked URL list data is kept only in ICP 50, CG 58, and network element 54 databases. The data contains a list of URLs or IP addresses that are blocked as dictated by ISP policy or as required by regulators or court order. Blocking is performed by CG 58 active process or network element 54. The list may be null. The list is used by the active process to present a browser screen to subscribers containing a "URL not available" message, or something similar, to the requesting subscriber.

Portal QoS Restriction URL List

Portal QoS restriction URL list data is kept only in ICP 50, CG 58, and network element 54 databases. The data contains a list of URLs or IP addresses of sites whose QoS are to be severely restricted by CG 58 active process or SPA-controlled network element 54 due to lack of contractual arrangements with an associated ISP to deliver high throughput or a high level of traffic generated into the network. The list may be null. Such restriction controls core network costs for an ISP.

Law Enforcement Agency "Copy to" List

Law enforcement agency "copy to" list data is kept only in ICP 50, CG 58, and network element 54 databases. The data contains a list of CGs 58, SPA-controlled network elements 54 or SPA-controlled content servers 56 being wiretapped, identified by a unique identifier, and the URL or IP address of the law enforcement site(s) to whose URL the traffic is to be copied. It is created by human input at active intervention system 64 upon receipt of a legal wiretap order. The list may be null. More than one agency may be copied.

Packet Inspection Pattern List

Packet inspection pattern list data is kept only in ICP 50, CG 58, and network element 54 databases. The data contains a list of patterns that the packet inspection routine in CGs 58 or SPA-controlled network elements 54 use to discover patterns that indicate viruses, traffic caused by viruses, or other unwanted data that is being sent into network 52.

Received Event Log

Received event log data is kept only in ICP 50 master database. The data contains a log of events reported by CGs 58, SPA-controlled content servers 56 or SPA-controlled network elements 54 to ICP 50. It may contain three fields: a unique ID for the CG 58 reporting it, an event ID and an event description.

Sent Event Log

Sent event log data is kept only in the CG 58, network element 54, and SPA-controlled content server 56 databases. The data contains a log of the events reported by CG 58, network element 54, or SPA-controlled content server 56 to ICP 50. It may contain three fields: a unique ID for CG 58, network element 54, or SPA-controlled content server 56 reporting it, an event ID and an event description.

Copyright Registry

Copyright registry data is kept only in ICP 50 master database. The data contains identifying information from the copyright holder or subscriber registrant and a file of the entire content that has been registered. Information from the files are used to produce file signatures that the packet inspection process may use to discover that a copyrighted work is being sent or received by e-mail and to block it.

Content in-Net

Content in-net data is kept only in ICP 50 master database. The data contains metadata for content that is presently available for subscriber download. Also the data may contain a set of pointers for each metadata file showing which SPA-controlled content servers 56 or CGs 58 have which portions of the content file presently available for download to CGs 58. In addition, the data may contain a set of pointers for each metadata file showing which of the SPA-controlled content servers 56 or CGs 58 are to replicate the content and metadata file and a progress indicator for the status of content download to other CGs 58.

Content on-Board and Being Downloaded

Content on-board and being downloaded data is kept only in the CG 58 and SPA-controlled content server 56 databases.

In CG 58 this data may contain metadata for content that is presently available for subscriber download or viewing. The data may also contain a set of pointers (sent from ICP 50) for each content file being downloaded showing which SPA-controlled content servers 56 or CGs 58 have which portions of the content file presently available for download to the CG 58. The data may also contain a set of pointers (sent from ICP 50) for each "seed" content file contained in CG 58 showing to which other CGs CG 58 is to replicate the content and metadata file to and a progress indicator for the status of content download to other CGs 58.

In SPA-controlled content server 56 this data may contain metadata for content that is presently available from SPA-controlled content server 56 for subscriber download from the corresponding SPA-controlled content server 56 to CG 58. The data may also contain a pointer for each metadata file showing which CGs 58 are to have the content file downloaded to them and a progress indicator for the status of content download to the CGs 58.

Pre-Authorization Flag

Pre-authorization flag data is kept only in ICP 50, network element 54, and SPA-controlled content server 56 databases. This data is used to ensure that the CG 58 being used by the subscriber is "ICP Managed." It is updated every time a CG goes from idle to active or active to idle, which is a transaction initiated by CG 58. An unpopulated pre-authorization flag is used by SPA-controlled network elements 54 or SPA-controlled content servers 56 to deny service to subscribers attempting to access network 52 with non-managed CGs 58.

This invention is not limited to the embodiments as explained above, but can be performed using various configurations. It will be apparent to those skilled in the art that various modifications and variations can be made in the context of the present invention, and in its practice, without departing from the scope and spirit of the invention.

What is claimed is:

1. A system for regulating access to content provided by a content server, the system comprising:
   a controller node configured to control access to the content provided by the content server, the controller node comprising:
      a first processor configured to generate controller instructions to allow access to one or more particular content files provided by the content server, wherein the controller instructions are configured to be executed by a plurality of gateway units, remotely disposed from the controller node and the content server, and coupled to the controller node and the content server via a network, to regulate access to the one or more particular content files provided by the content server, by subscriber terminals selectively coupled to the gateway units, including distributedly implementing a digital rights management service on behalf of the controller node; and
      a first network interface coupled to the first processor, and configured to transmit the controller instructions to the gateway units over the network, wherein subsequent to receipt of the controller instructions, the gateway units to receive a user request for the one or more particular content files and in response, to provide the one or more particular content files to the user prior to further input or instruction from the controller node;
   wherein each of the plurality of gateway units is located at a subscriber location and is further configured to be tamper resistant with respect to access of the controller node provided controller instructions by the subscriber terminals, wherein at least one of the tamper resistant gateway units comprise:
      a housing;
      a detector configured to detect an attempt to open the housing; and
      a storage device configured to store the controller instructions; and a second processor configured to prevent access to the storage device when the detector detects an attempt to open the housing, in accordance with the controller instructions.

2. The system of claim 1 wherein:
at least one gateway unit further comprises an identifier uniquely associating the corresponding gateway unit with a user; wherein the corresponding storage device is further configured to store information associated with the user, in accordance with the controller instructions.

3. The system of claim 1, wherein:
at least one of the gateway units comprises an interface configured to receive requests to transmit data for a coupled subscriber terminal; and
the at least one gateway unit further comprises a second processor configured to inspect the data to selectively transmit none, some or all of the data for the requesting subscriber terminal, in accordance with the controller instructions.

4. The system of claim 1, wherein:
at least one of the gateway units comprises an interface configured to receive requests to retrieve the content files for a coupled subscriber terminal; and
the second processor is configured to inspect the content files to selectively provide none, some or all of the retrieved content files to the requesting subscriber terminal, in accordance with the controller instructions.

5. The system of claim 1, wherein the first processor is configured to generate the controller instructions automatically.

6. The system of claim 1, wherein the first processor is configured to generate the controller instructions in response to an operator-entered request.

7. The system of claim 1, wherein the controller node is included in a plurality of controller nodes, and wherein the controller node comprising the first processor is configured to generate the controller instructions by operator-controlled network crawling.

8. The system of claim 1, wherein the controller instructions are configured to deny users of the subscriber terminals access to one or more other content servers, in accordance with the controller instructions.

9. The system of claim 8, wherein at least one of the gateway units comprises an additional processor configured to generate a notification to the controller node in response to a network access request to access one of the one or more other content servers by a coupled subscriber terminal, in accordance with the controller instructions.

10. The system of claim 8, wherein at least one of the plurality of gateway units comprises an additional processor configured to:
detect a network access request to access one of the one or more other content servers by a coupled subscriber terminal; and
re-direct the network access request to one or more other content servers;
wherein the detect and re-direct are performed in accordance with the controller instructions.

11. The system of claim 1, wherein:
the controller instructions are configured to include a file identifier; and
at least one of the plurality of gateway units is configured to be associated with a user file system, and the at least one gateway units comprises an additional processor configured to detect a file in the user file system corresponding to the file identifier, in accordance with the controller instructions.

12. The system of claim 11, wherein the at least one gateway unit is configured to be operable between an active state and an inactive state.

13. The system of claim 12, wherein the additional processor is configured to notify the controller node in response to the at least one gateway unit entering an inactive state, in accordance with the controller instructions.

14. The system of claim 12, wherein the additional processor is configured to delete the detected file from the user file system, in accordance with the controller instructions.

15. The system of claim 14, wherein the additional processor is configured to delete the detected file from the user file system during the inactive state.

16. The system of claim 11, wherein the at least one gateway unit is configured to notify the controller node if a file corresponding to the file identifier is detected in the associated user file system, in accordance with the controller instructions.

17. The system of claim 1, wherein the at least one gateway unit is further configured to notify the controller node of a detected attempt to open the housing, in accordance with the controller instructions.

18. The system of claim 1, wherein the second processor is configured to enter a corresponding gateway unit into a user-controlled operational mode after receiving permission from the controller node, in accordance with the controller instructions.

19. The system of claim 1, wherein the controller node comprises a copyright registry configured to track copyright status of content files distributed to subscriber terminals, via one or more of the gateway units.

20. The system of claim 19, wherein at least one of the gateway units comprises an interface configured to transmit copyright registrations of content data files to the copyright registry, in accordance with the controller instructions.

21. The system of claim 1, wherein at least one of the gateway units comprises an additional processor configured to cause the at least one gateway unit to access a predetermined network site upon initiation of network browser software on a coupled subscriber terminal, in accordance with the controller instructions.

22. The system of claim 21, wherein the additional processor is configured to select the predetermined network site from a list of predetermined network sites, in accordance with the controller instructions.

23. The system of claim 22, wherein the additional processor is configured to select the predetermined network site according to a weighting function such that at least a portion of the predetermined network sites are selected more often than others, in accordance with the controller instructions.

24. The system of claim 1, wherein at least one of the gateway units comprises a user interface and a second network interface configured to:
receive registration information from a user of a coupled subscriber terminal via the user interface; and
receive initial operating parameters from the controller node via the second network interface;
wherein both receive operations are in accordance with the controller instructions.

25. The system of claim 1, wherein at least one of the gateway units comprises a user interface and a second network interface configured to:
receive registration information from a user of a coupled subscriber terminal via the user interface; and
receive software updates from the controller node via the second network interface;

wherein both receive operations are in accordance with the controller instructions.

26. The system of claim 1, wherein:
at least one of the gateway units comprises a user interface and a second network interface configured to transmit advertisements via the user interface to a user display of a coupled subscriber terminal, wherein the advertisements are customized in accordance with content received via the second network interface, in accordance with the controller instructions.

27. The system of claim 1, wherein at least one of the gateway units comprises a user interface configured to:
transmit pay-per-view advertising via the user interface to a coupled subscriber terminal for selective display by a user of the subscriber terminal; and
report to the controller node for payment credits for the user upon selective display of an advertisement by the user;
wherein the transmit and report operations are in accordance with the controller instructions.

28. The system of claim 27, wherein the at least one gateway units is configured to generate one of a plurality of viewing modes for viewing the pay-per-view advertising in response to a user selection, in accordance with the controller instructions.

29. The system of claim 1, wherein at least one of the gateway units comprises a second network interface configured to receive software via the second network interface for execution on the second processor, the software to enable at least one of a fee-based network service, network video calling, and network gaming, in accordance with the controller instructions.

30. The system of claim 1, wherein the second processor is configured to detect a denial-of-service attack, in accordance with the controller instructions.

31. The system of claim 30, wherein the second processor is configured to detect a denial-of-service attack initiated by a virus.

32. The system of claim 1, wherein at least one of the gateway units is configured to selectively transmit to law enforcement terminals information describing at least one of incoming data to and outgoing data from the at least one of the gateway units, in accordance with the controller instructions.

33. The system of claim 1, wherein at least one of the gateway units is configured to:
detect a user attempt to access at least one of transmit and receive voice traffic; and
selectively block the detected attempt;
wherein the detect and selective block are in accordance with the controller instructions.

34. The system of claim 33 wherein at least one of the gateway units comprises an interface configured to transmit, via the interface, an advertisement offering voice transmission services, in accordance with the controller instructions.

35. The system of claim 1, wherein at least one of the gateway units is configured to:
detect a user attempt to access at least one of transmit and receive at least one of audio or video traffic; and
selectively block the detected attempt;
wherein the detect and selective block are in accordance with the controller instructions.

36. The system of claim 35, wherein at least one of the gateway units comprises an interface configured to transmit, via the interface, an advertisement offering at least one of audio and video traffic services, in accordance with the controller instructions.

37. The system of claim 1, wherein at least one of the gateway units comprises a second network interface configured to:
detect at least one of audio and video traffic flowing through the second network interface; and
selectively reduce the quality of service of the at least one of audio and video traffic;
wherein the detect and selective reduction are in accordance with the controller instructions; and
wherein reduction of quality of service comprises at least one of:
reducing a duty cycle, inserting TCP/IP messages in the at least one of audio and video traffic, inserting Nak/Ack pairs in the at least one of audio and video traffic, and inserting X-On/X-Off pairs in the at least one of audio and video traffic.

38. The system of claim 1, further comprising a plurality of access nodes, wherein the first processor is further configured to generate authorization instructions and transmit the authorization instructions to the access nodes, and the access nodes are configured to:
receive the authorization instructions from the controller node; and
selectively permit the gateway units to access the network in accordance with the authorization instructions.

39. The system of claim 1, wherein at least one of the gateway units comprises data storage units partitioned into a network portion and a user portion, and the at least one gateway units is configured to selectively share data stored in the network partition with at least one of another gateway unit, via a second network interface of the at least one gateway unit, in accordance with the controller instructions.

40. The system of claim 1, wherein the second processor is configured to selectively forward content data received from a first other gateway unit to a second other gateway unit, in accordance with the controller instructions.

41. The system of claim 1, wherein the second processor is further configured to:
receive portions of a content file from a group of other gateway units; and
assemble a content file based on the received portions for transmission to a user of a coupled subscriber terminal, via the user interface;
wherein the receive and assemble are in accordance with the controller instructions.

42. The system of claim 1, further comprising an intervention node, wherein the intervention node includes:
an operator interface configured to receive operator-entered spoofing attack instructions; and
a second network interface configured to transmit at least one substitute file pointer to addresses in the network in accordance with the spoofing attack instructions.

43. A gateway unit for regulating access to content provided by a content server, comprising:
a network interface configured to receive controller instructions from a controller node, the gateway unit remotely disposed from the controller node and the content server, and coupled to the controller node and the content server via a network; and
a processor configured to execute the controller instructions to regulate access by subscriber terminals selectively coupled to the gateway unit of content files provided by the content server, including distributedly implementing a digital rights management service on behalf of the controller node, wherein subsequent to receipt of the controller instructions, the network interface to receive a user request for one or more of the content files and in response, to provide the one or more content files to the user prior to receiving further input or instruction from the controller node;

wherein the gateway unit is further configured to be tamper resistant with respect to access of the controller node provided controller instructions by the subscriber terminals, the gateway unit comprising:

a housing;

a detector configured to detect an attempt to open the housing;

a storage device configured to store the controller instructions; and a second processor configured to prevent access to the storage device when the detector detects an attempt to open the housing, in accordance with the controller instructions.

44. The gateway unit of claim 43, wherein the processor is further configured to enter a user-controlled operational mode after receiving permission from the controller node.

45. The gateway unit of claim 43, wherein the processor is further configured to select a predetermined network site from a list of predetermined network sites, in accordance with the controller instructions.

46. The gateway unit of claim 45, wherein the processor is further configured to select from the list of predetermined network sites according to a weighting function such that at least a portion of the predetermined network sites are selected more often than others, in accordance with the controller instructions.

47. An apparatus, comprising:

means for generating controller instructions to allow access to one or more particular content files provided by a content server, wherein the controller instructions are configured to be executed by a gateway unit, the gateway unit remotely disposed from the means for generating the controller instructions and the content server, and coupled to a controller node including the means for generating controller instructions and the content server via a network, the controller instructions to regulate access to the one or more particular content files provided by the content server to a subscriber terminal selectively coupled to the gateway unit, including distributedly implementing a digital rights management service on behalf of the controller node; and means to transmit the controller instructions to the gateway unit over the network, wherein subsequent to receipt of the controller instructions, the gateway unit to receive a subscriber request for the one or more particular content files and in response, to provide the one or more particular content files to the subscriber prior to further input or instruction from the controller node;

wherein the gateway unit is located at a subscriber location and is further configured to be tamper resistant with respect to access of the controller node provided controller instructions by the subscriber terminal, the gateway unit comprising:

a housing;

a detector configured to detect an attempt to open the housing;

a storage device configured to store the controller instructions; and a second processor configured to prevent access to the storage device when the detector detects an attempt to open the housing, in accordance with the controller instructions.

48. An apparatus, comprising:

first means for receiving controller instructions from a controller node, the apparatus remotely coupled to the controller node and a content server via a network;

second means configured to execute the controller instructions to regulate access by subscriber terminals of content provided by the content server, including distributedly implementing a digital rights management service on behalf of the controller node, wherein subsequent to receipt of the controller instructions by the first means, the first means to receive a user request for one or more particular content files and in response, to provide the one or more particular content files to a subscriber terminal prior to further input or instruction from the controller node;

wherein the apparatus including the first means and the second means is located at a subscriber location and is further configured to be tamper resistant with respect to access by the subscriber terminal of the controller node provided controller instructions, the apparatus further comprising:

a housing;

a detector configured to detect an attempt to open the housing;

a storage device configured to store the controller instructions; and a second processor configured to prevent access to the storage device when the detector detects an attempt to open the housing, in accordance with the controller instructions.

49. The system of claim 1 wherein the controller instructions are further configured to cause the plurality of gateway units to inhibit access by a second plurality of subscriber terminals to content provided by the content server.

50. The gateway unit of claim 43 wherein the controller instructions are configured to regulate processing by network units of the content files provided by the content server.

* * * * *